United States Patent
Kamat et al.

(10) Patent No.: US 12,069,509 B2
(45) Date of Patent: Aug. 20, 2024

(54) ADMISSION AND CONGESTION CONTROL SERVICE

(71) Applicant: Verizon Patent and Licensing Inc., Basking Ridge, NJ (US)

(72) Inventors: Sachin Kamat, East Brunswick, NJ (US); Jeremy Nacer, Boca Raton, FL (US); Sudhir Patel, Boonton, NJ (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 555 days.

(21) Appl. No.: 17/032,073

(22) Filed: Sep. 25, 2020

(65) Prior Publication Data

US 2022/0104064 A1 Mar. 31, 2022

(51) Int. Cl.
  *H04W 28/02* (2009.01)
  *H04W 48/06* (2009.01)

(52) U.S. Cl.
  CPC ... *H04W 28/0289* (2013.01); *H04W 28/0284* (2013.01); *H04W 48/06* (2013.01)

(58) Field of Classification Search
  CPC ......... H04W 28/0289; H04W 28/0284; H04W 48/06
  See application file for complete search history.

(56) References Cited

U.S. PATENT DOCUMENTS

| | | | |
|---|---|---|---|
| 2015/0009887 A1* | 1/2015 | Chen | H04W 48/12 370/312 |
| 2015/0117185 A1* | 4/2015 | Kim | H04W 28/0289 370/230 |
| 2015/0119015 A1* | 4/2015 | Gai | H04W 76/15 455/418 |
| 2018/0020382 A1* | 1/2018 | Kim | H04W 48/02 |
| 2018/0139652 A1* | 5/2018 | Lien | H04W 28/085 |
| 2018/0288676 A1* | 10/2018 | Wei | H04L 63/101 |
| 2019/0174392 A1* | 6/2019 | Chun | H04W 48/02 |
| 2019/0261261 A1* | 8/2019 | Ishii | H04W 48/06 |
| 2021/0227450 A1* | 7/2021 | Chun | H04W 48/20 |
| 2022/0322211 A1* | 10/2022 | Maria | H04W 48/16 |

FOREIGN PATENT DOCUMENTS

| | | | |
|---|---|---|---|
| RU | 2667148 C2 * | 9/2018 | ............ H04W 16/32 |
| WO | WO-2013167146 A1 * | 11/2013 | ............ H04W 4/021 |
| WO | WO-2019014993 A1 * | 1/2019 | ............ H04W 74/08 |
| WO | WO-2021029636 A1 * | 2/2021 | |

OTHER PUBLICATIONS

Remote Provisioning Architecture for Embedded UICC. Technical Specification. Version 3.2 27. GSM Association. Jun. 2017, 309 pages.

* cited by examiner

*Primary Examiner* — Basil Ma

(57) ABSTRACT

A method, a device, and a non-transitory storage medium are described in which an admission and congestion control service is provided. The service may dynamically reconfigure admission control information of an end device. The admission control information may include one or multiple types of access class values of the end device or an application of the end device.

20 Claims, 9 Drawing Sheets

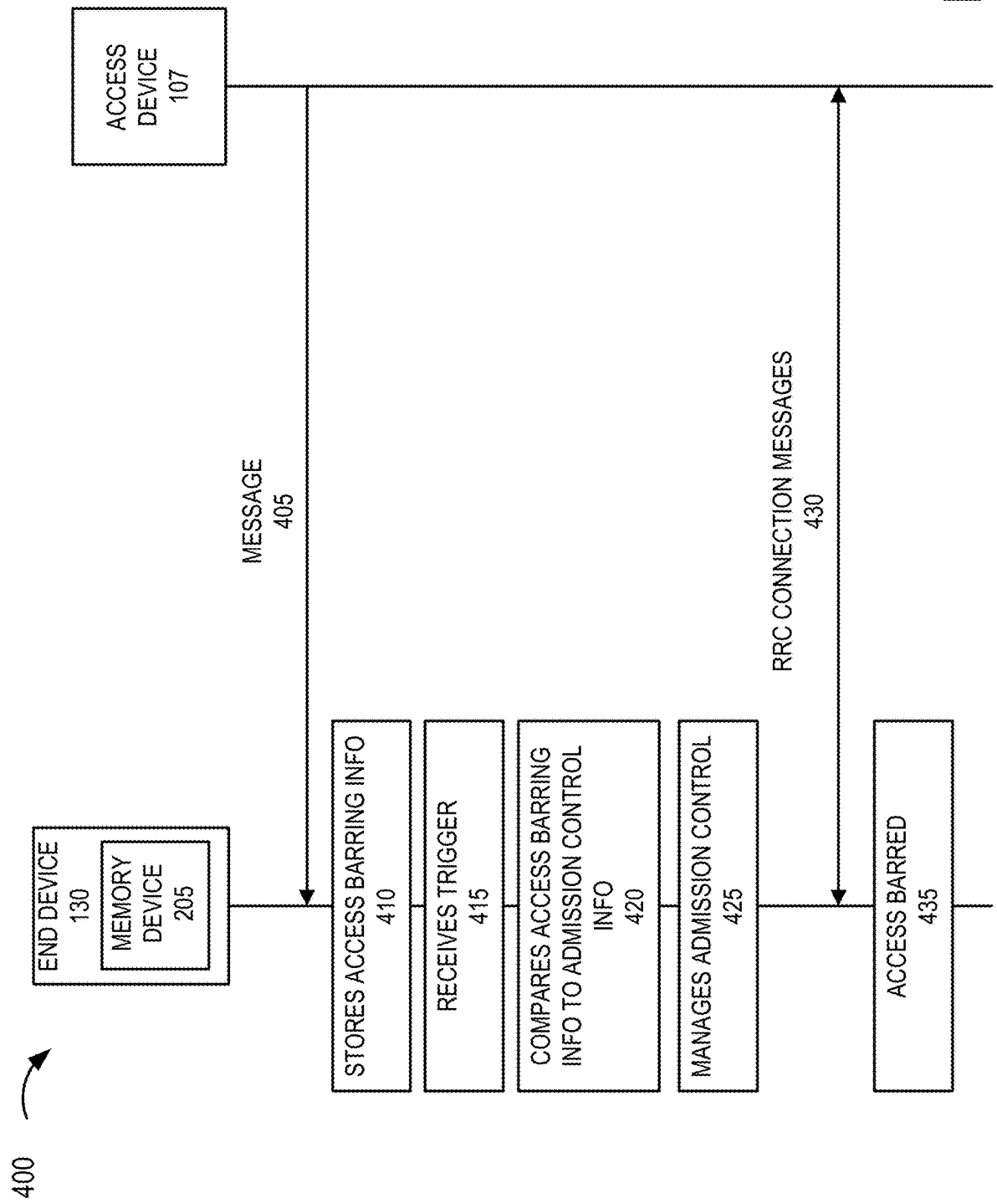

ADMISSION AND CONGESTION CONTROL SERVICE

BACKGROUND

Development and design of radio access networks (RAN) and core networks present certain challenges from a network-side perspective and an end device perspective. For example, depending on the configurations from both network-side and end device-side perspectives, such configurations may reduce the effective use of resources, impact the provisioning of a wireless service, and its accessibility and use of the wireless service by end devices. Accordingly, a need exists to overcome these challenges.

BRIEF DESCRIPTION OF THE DRAWINGS

FIG. 4 is a diagram illustrating yet another exemplary process of an exemplary embodiment of the admission and congestion control service;

DETAILED DESCRIPTION

Figure 1:
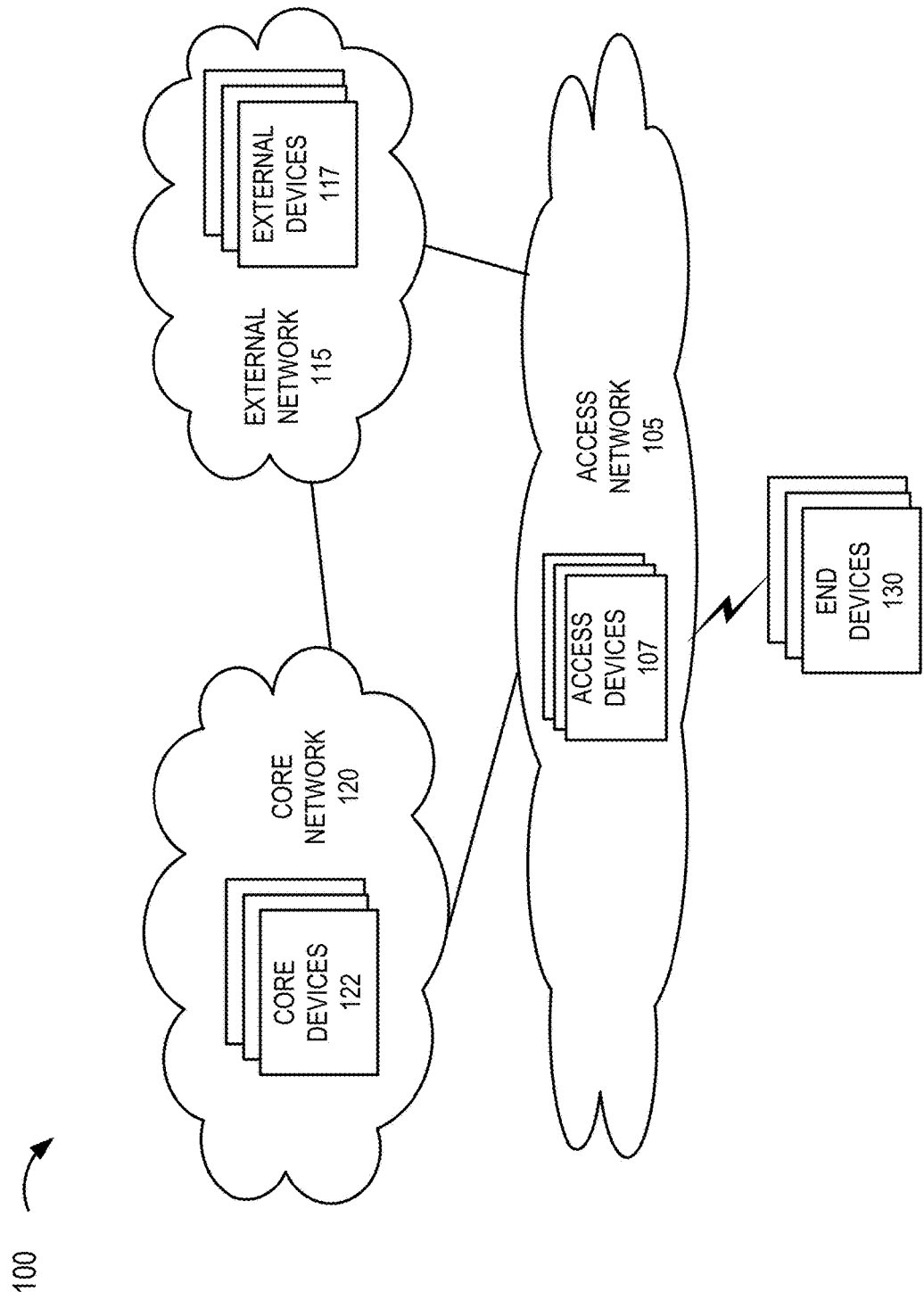
FIG. 1 is a diagram illustrating an exemplary environment in which an exemplary embodiment of an admission and congestion control service may be implemented.

The following detailed description refers to the accompanying drawings. The same reference numbers in different drawings may identify the same or similar elements. Also, the following detailed description does not limit the invention.

Various access control methods can manage admission control of end devices to a wireless network, such as access class barring (ACB) (e.g., barring access classes 0-9, differentiating call accesses based on multimedia telephone (MMTEL) traffic type), ACB with access class (AC) differentiation (e.g., differentiating access classes 11-15 relative to access classes 0-9), ACB with emergency AC differentiation (e.g., differentiating access class 10 from other access classes), and extended access barring (EAB). However, a mobile operator, a wireless service provider, or other type of entity does not have an efficient way of managing a massive number of end devices connecting to a same RAN device such as an evolved Node B (eNB), a next generation Node B (gNB), or other type of RAN device, at approximately the same time. Consequently, when the RAN device is subject to a number of connection requests beyond its capacity, there is no reliable way for the network to manage end device behavior or even allow certain end devices afforded priority over other end devices of a same type.

Additionally, an access class (AC) may be assigned randomly into a subscriber identity module (SIM) card, a universal integrated circuit card (UICC), an embedded UICC (eUICC), or another type of memory device during manufacturing. For example, AC may be assigned randomly into an elementary file (EF) of the SIM card during SIM manufacturing, which may be the last digit of a SIM card's International Mobile Subscriber Identity (IMSI). As a result, a mobile operator or other type of entity cannot control and/or bar certain end devices while allowing other end devices of the same type requesting connection from the same RAN device around the same time. As an example, assume a container ship arrives to a port carrying 5,000 Category M1 (Cat-M1) or Narrowband Internet of Things (NB-IoT) devices and these end devices all attempt to connect to an eNB or a gNB around the same time even though the capacity of the eNB or the gNB may be limited to 100 connections simultaneously.

According to exemplary embodiments, an admission and congestion control service is described. According to an exemplary embodiment, a memory device of an end device may be configured with admission control information and logic for accessing a wireless network. For example, the memory device may be implemented as a SIM card, a UICC, an eUICC, a smart card, or another type of storage device. According to an exemplary embodiment, the admission control information may be configured by a server device. According to an exemplary embodiment, the memory device includes client logic that supports communication with the server device.

According to an exemplary embodiment, the server device includes logic that provides the admission and congestion control service, as described herein. The server device may be implemented as an Open Mobile Alliance (OMA) Device Management (DM) server, an OMA Lightweight Machine to Machine (LW M2M) server, an Over-The-Air (OTA) server (e.g., a SIM OTA server or other type of smart card OTA server), an EAB server, or another type of server device (e.g., proprietary server, non-standard server, hybrid server, a non-OMA server, etc.). According to an exemplary embodiment, the server device includes server logic that supports communication with the client logic of the end device.

According to an exemplary embodiment, the admission control information may include EAB configuration information, as described herein. For example, the admission control information may include information indicating whether or not EAB is enabled or disabled on the end device, the total number of EAB levels supported on the end device, a default EAB class value, a current EAB class value, and timed EAB class value parameters, as described herein.

According to an exemplary embodiment, the server device of the admission control and congestion service, as described herein, may use artificial intelligence (AI) and/or machine learning (ML) logic that may update admission control information of the end device based on various criteria, such as a congestion level in the RAN, a geo-location of the end device, roaming of the end device, or another type of criterion or event. According to an exemplary embodiment, the server device may store and manage admission control information relating to end devices.

According to an exemplary embodiment, the admission and congestion control service may be implemented for various end devices, such as Fourth Generation (4G) devices, 4.5G devices, Fifth Generation (5G) devices, future generation devices (e.g., Sixth Generation (6G) devices or other generation devices), M2M devices, smartphones, user equipment, IoT devices, and/or other types of end devices, as described herein, that may include or use the memory device.

According to various exemplary embodiments, the admission and congestion control service may be implemented based on a category of an end device (e.g., 5G, Cat-1, Cat-M1, Cat-NB1, or other category), an identifier of the end device (e.g., an International Mobile Equipment Identity (IMEI)), an identifier of a memory device (e.g., an Integrated Circuit Card Identifier (ICCID)), and/or other types of identifiers, such as a network access identifier (NAI), an International Mobile Subscriber Identity (IMSI), a subscription permanent identifier (SUPI), a Mobile Directory Number (MDN), or the like. According to other exemplary embodiments, the admission and congestion control service may be implemented based on a per-application basis and/or category of application. For example, for an end device that may include multiple applications, the memory device may include different admission control information for the different applications, as described herein.

According to an exemplary embodiment, the admission control and congestion service may be dynamically enabled or disabled for an end device based on the location of the end device. According to an exemplary embodiment, an update to the admission control information may cause the end device to re-attach to the network (e.g., a core network) and/or re-establish a radio connection with a RAN device.

In view of the foregoing, the admission control and congestion service may allow dynamic configuration of admission control information of an end device and memory device, and manage priority of end device connections to the RAN and other networks (e.g., a core network, an application layer network, or other type of network).

FIG. 1 is a diagram illustrating an exemplary environment 100 in which an exemplary embodiment of the admission and congestion control service may be implemented. As illustrated, environment 100 includes access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, external network 115 or core network 120 may be omitted. Additionally, or alternatively, other networks not illustrated in FIG. 1 may be included, such as an X-haul network (e.g., backhaul, mid-haul, fronthaul, etc.), as described herein.

The number, the type, and the arrangement of network devices, and the number of end devices 130 are exemplary. A network device, a network element, or a network function (also referred to as a network device) may be implemented according to one or multiple architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the admission and congestion control service may use at least one of these planes of communication. Additionally, an interface of a network device and/or an end device may be modified relative to an interface defined by a standard, such as Third Generation Partnership Project (3GPP), International Telecommunication Union (ITU), European Telecommunications Standards Institute (ETSI), GSM Association (GSMA), Open RAN (O-RAN) Alliance, other entity), an interface not defined by a standard, or a new interface of the network device may be provided in order to support the communication (e.g., transmission and reception of messages, information elements (IE), attribute value pairs (AVPs), etc.) between network devices and end devices that support the admission and congestion control service, as described herein. According to various exemplary implementations, the interface of a network device may be a service-based interface, a reference point-based interface, an O-RAN interface (e.g., virtual and/or proxy), a future generation interface, or other type of interface.

Access network 105 may include one or multiple networks of one or multiple types and technologies. For example, access network 105 may be implemented to include a 5G-access network (5G-AN) or a 5G-RAN (referred to herein as simply a 5G-RAN), a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), an optical network, or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a NG core (NGC) network, or the splitting of the various layers (e.g., physical layer, Media Access Control (MAC) layer, RLC layer, and PDCP layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone NR, standalone NR, etc.).

According to some exemplary embodiments, access network 105 may be implemented to include various architectures of wireless service, such as, for example, macrocell, microcell, femtocell, picocell, metrocell, new radio (NR) cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, licensed radio spectrum, unlicensed radio spectrum, above mm wave), and/or other attributes or technologies used for radio communication.

Depending on the implementation, access network 105 may include one or multiple types of network devices, such as access devices 107. For example, access device 107 may include a gNB), an evolved Long Term Evolution (eLTE) eNB, an eNB, a radio network controller (RNC), a remote radio head (RRH), a baseband unit (BBU), a radio unit (RU), a CU, a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB), 5G ultra-wide band (UWB) nodes, a future generation wireless access device (e.g., a 6G wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard-bonding based on demands and needs. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth.

External network 115 may include one or multiple networks of one or multiple types and technologies. For example, external network 115 may be implemented to include a service or an application-layer network, a cloud network, a private network, a public network, a multi-access edge computing (MEC) network (also known as a mobile edge computing), a fog network, the Internet, a service provider network, the World Wide Web (WWW), an Internet Protocol Multimedia Subsystem (IMS) network, a Rich Communication Service (RCS) network, software defined network (SDN), a virtual network, a packet-switched network, a data center, or other type of network that may provide access to an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.).

According to some exemplary embodiments, external devices 117 may include a network device that provides the admission and congestion control service, as described herein. For example, a server device may be configured to provide the admission and congestion control service. As previously mentioned, the server device may be implemented as an EAB server, an OMA DM server, an OMA LW M2M server, an OTA server, or another type of server or network-side device.

External devices 117 may host one or multiple types of application services. The application services may or may not pertain to the admission and congestion control service, as described herein. For example, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text, voice, conferencing, instant messaging, etc.), video streaming, and/or other types of wireless application services.

Core network 120 may include one or multiple networks of one or multiple network types and technologies. Core network 120 may include a complementary network of access network 105. For example, core network 120 may be implemented to include a next generation core (NGC) network, an Evolved Packet Core (EPC) of an LTE, an LTE-Advanced, an LTE-A Pro, and/or a future generation core network (e.g., a 6G or beyond core network, etc.).

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

According to some exemplary embodiments, core devices 122 may include a network device that provides the admission and congestion control service, as described herein. For example, a server device may be configured to provide the admission and congestion control service. As previously mentioned, the server device may be implemented as an EAB server, an OMA DM server, an OMA LW M2M server, an OTA server, or another type of server or network-side device.

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device. End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and flavors of network slicing, DC service, and/or other types of connectivity services. Additionally, end device 130 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 130 may vary among end devices 130.

According to an exemplary embodiment, end device 130 includes a memory device that provides the admission and congestion control service, as described herein. For example, the memory device may be implemented as a SIM card, a UICC, an eUICC, a smart card, or another type of storage device. The memory device may include logic that uses admission control information to manage network access to a network (e.g., access network 105, core network 120, external network 115), as described herein. For example, the memory device may include an application, a program, a module, a script, or other type of entity that may execute instructions to provide the logic of the admission and congestion control service.

Figure 2:
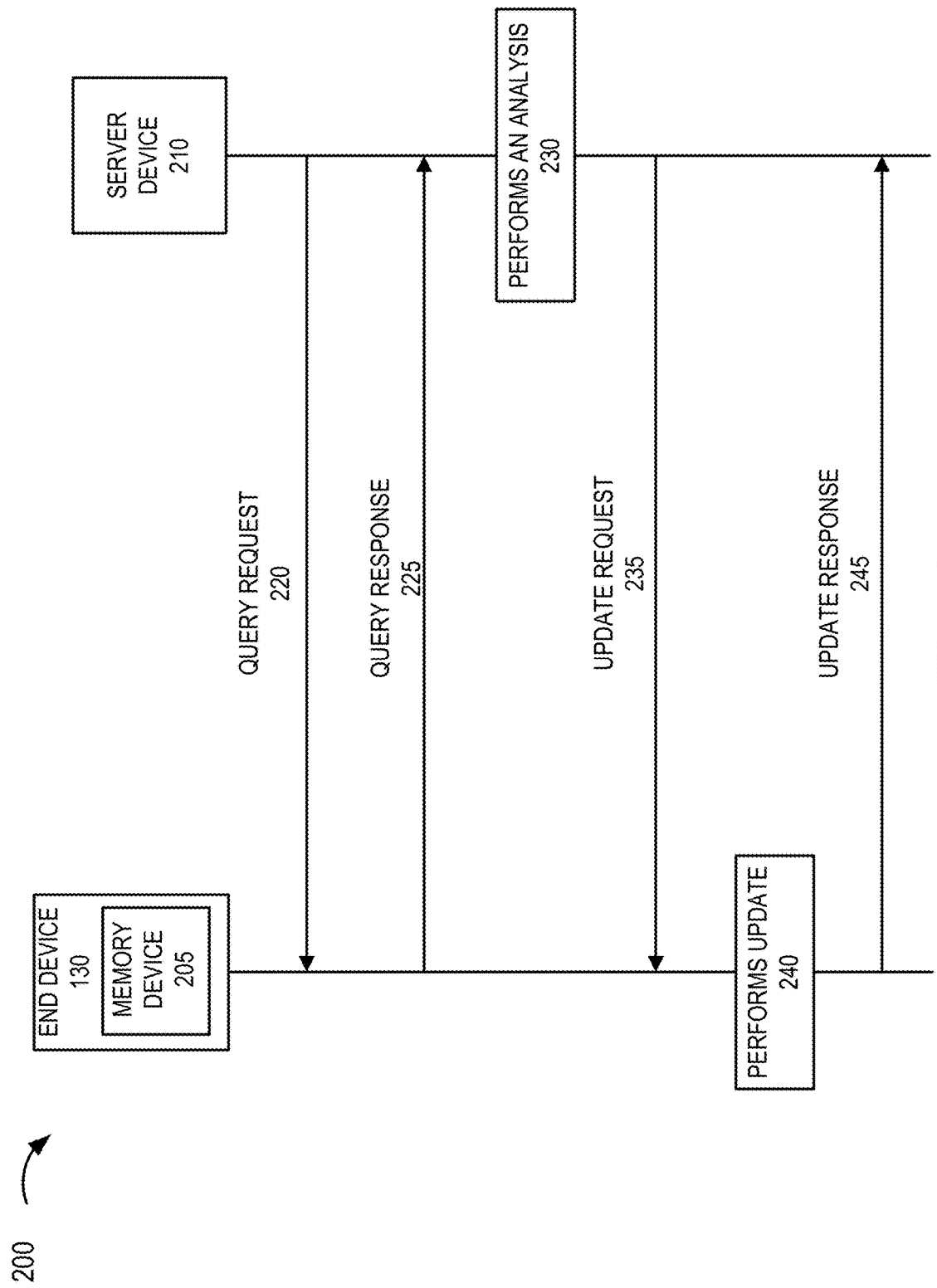
FIG. 2 is a diagram illustrating an exemplary process of an exemplary embodiment of the admission and congestion control service.

FIG. 2 is a diagram illustrating an exemplary process 200 of an exemplary embodiment of the admission and congestion control service. As illustrated, according to an exemplary scenario, environment 200 includes end device 130 and a server device 210. End device 130 includes a memory device 205. Although not illustrated, environment 200 may include intermediary networks and devices that support communication between end device 130 and server device 210, such as access network 105 and access device 107. According to various exemplary embodiments, server device 210 may reside in core network 120, external network 115, or some other network, or may be co-located in access network 105.

According to an exemplary embodiment, process 200 includes server device 210 configuring end device 130 via memory device 205 for admission and congestion control. Process 200 may be performed at any time end device 130 may be connected to a network (e.g., access network and/or core network). As illustrated, in step (1), server device 210 may transmit a query request 220 to end device 130. Query request 220 may request current admission control information stored by memory device 205. According to various exemplary implementations, server device 210 may request one or multiple parameters and values of the admission control information, as described herein. In step (2), in response to receiving query request 220, end device 130 and/or memory device 205 may read or scan the admission control information. Exemplary admission control information that may be stored by memory device 205 is described further below. According to other embodiments, steps (1) and (2) may be omitted. For example, server device 210 may have recently or previously queried end device 130 for such information.

Figure 3A:
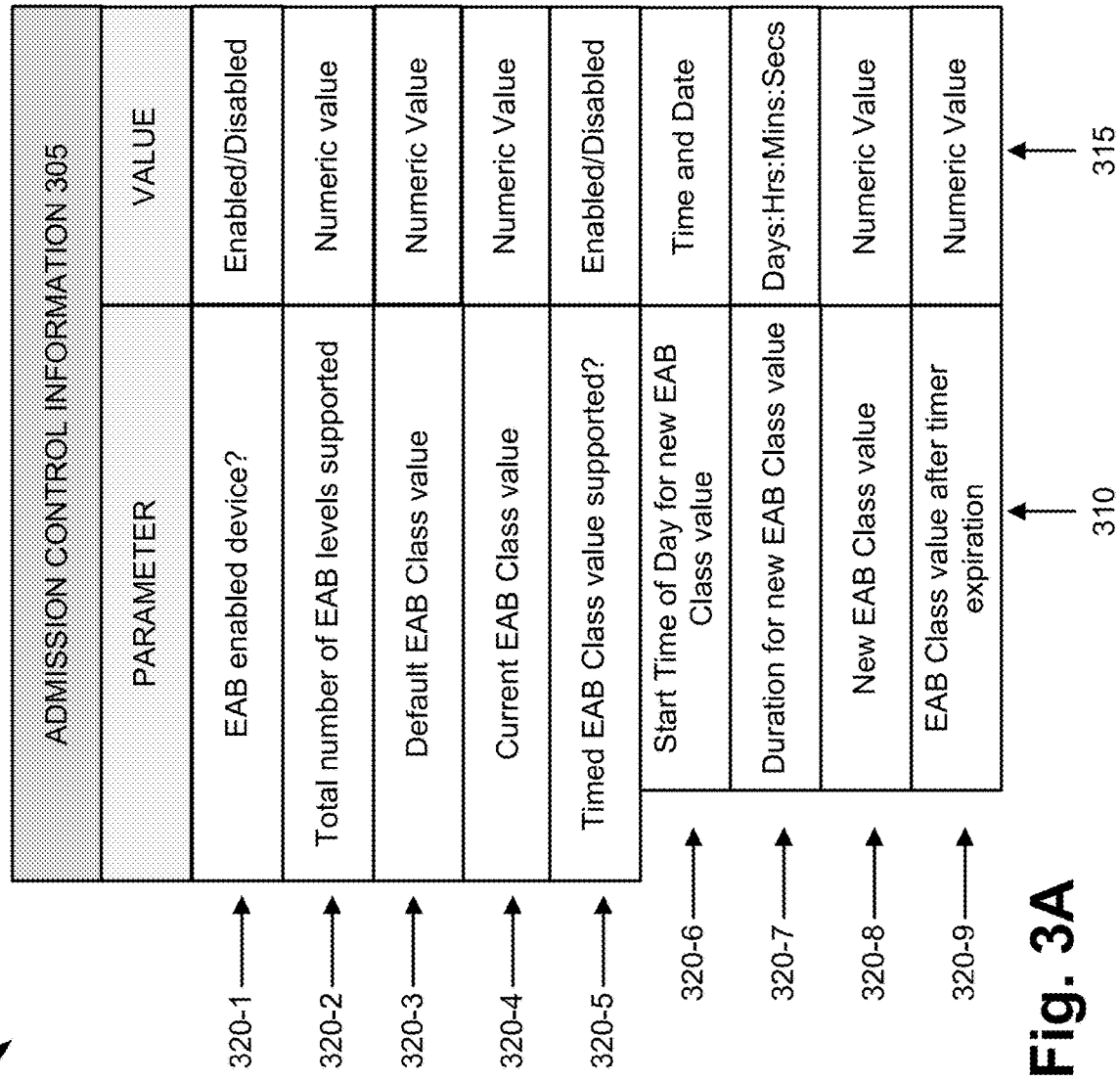
FIG. 3A is a diagram illustrating exemplary admission control information.

FIG. 3A is a diagram illustrating exemplary admission control information that may be stored in a table 300. As illustrated, admission control information 305 may include a parameter field 310 and a value field 315. As further illustrated, admission control information 305 may include mappings 320-1 through 320-9 (also referred to collectively as mappings 320 or individually or generally as mapping 320) between parameter field 310 and value field 315. As such, parameter field 310 may store a parameter of the admission and congestion control service, and value field 315 may store a configurable value or entry for the parameter. The parameters and values described in relation to mappings 320 are merely exemplary.

Admission control information 305 is illustrated in tabular form merely for the sake of description. According to other implementations, admission control information 305 may be implemented in a data structure different from a table (e.g., a list, a flat file, etc.), a database, or other type of data file.

Mapping 320-1 may include a parameter that controls the enabling or disabling of the admission and congestion control service at end device 130, and a value that may indicate that the admission and congestion control service is enabled/active or disabled/inactive. According to exemplary implementation, for mappings 320-2 through 320-9 to impact the operation of end device 130, mapping 320-1 may be required to be enabled/active.

Mapping 320-2 may include a parameter that indicates a total number of admission control levels for end device 130, and a value that may indicate the total number of admission control levels. For example, the value may be a numeric value between 0-9 or some other configurable numeric value. Mapping 320-3 may include a parameter that indicates a default class value relating to admission/access by end device 130 to a network, and a value that may indicate the default class value. For example, the value may be a numeric value between 0-9 or some other configurable numeric value. Mapping 320-4 may include a parameter that indicates a current class value, and a value that may indicate the current class value. For example, the value may be a numeric value between 0-9 or some other configurable numeric value.

Mapping 320-5 may include a parameter that controls the enabling or disabling of a timed class value, and a value that may indicate that the timed class value is enabled/active or disabled/inactive at end device 130. For example, end device 130 may be configured with a class value for a specified time period, as described herein. When mapping 320-5 is enabled/active, mappings 320-6 through 320-9 may provide additional parameters/values that further configure the timed class value included in the admission and congestion control service, as described herein. For example, mapping 320-6 may include a parameter that indicates a start time for a (new) class value, and a value that may indicate the start time (e.g., date, day, time).

Mapping 320-7 may include a parameter that indicates a duration of the timed class value, and a value that may indicate the duration (e.g., days, hours, minutes, seconds, etc.). According to other examples, although not illustrated, admission control information 305 may include a mapping 320 that specifies other context information, such as location of end device 130. The location may be specified on a cell, sector, and/or sub-sector level associated with access device 107, a geographic area (e.g., city block(s), building, etc.), or some other configurable area (e.g., a tracking area code (TAC), etc.).

Mapping 320-8 may include a parameter that indicates a new class value, and a value that indicates the new class value. For example, the value may be a numeric value between 0-9 or some other configurable numeric value. Mapping 320-9 may include a parameter that indicates a class value after the duration of the timed class value has expired, and a value that may indicate the class value. For example, the value may be a numeric value between 0-9 or some other configurable numeric value.

According to other exemplary implementations, table 300 may store additional, fewer, and/or different instances of admission control information 305 in support of the admission and congestion control service, as described herein. For example, mappings 320 as described herein may apply on a per application basis and/or per category of application basis. For example, end device 130 may include applications that may be managed with different default class values, current class values, total number of levels supported, timed class values, and so forth. This may be in addition to a per end device basis or instead of a per end device basis.

Referring back to FIG. 2, based on the reading or scanning of admission control information, in step (2), end device 130 and/or memory device 205 may generate and transmit a query response 225 to server device 210. Query response 225 may include one or multiple instances of the admission control information. For example, depending on query request 220, end device 130 and/or memory device 205 may provide all or a portion (e.g., one or multiple mappings 320) of the admission control information 305.

In response to receiving query response 225, in step (3), server device 210 may perform an analysis 230. According to an exemplary embodiment, server device 210 may include AWL logic that may determine the admission control configuration of end devices 130. For example, server device 210 may determine whether or not end device 130 is to be re-configured or updated with new admission control information, and if so, what the reconfiguration or update is. For example, server device 210 may determine the substance of the reconfiguration or update in relation to the parameters and values afforded by the admission control information. Server device 210 may also update or reconfigure the admission control information for current and/or prospective operation of end device 130. A further description of the analysis by server device 210 is provided below.

Figure 3B:
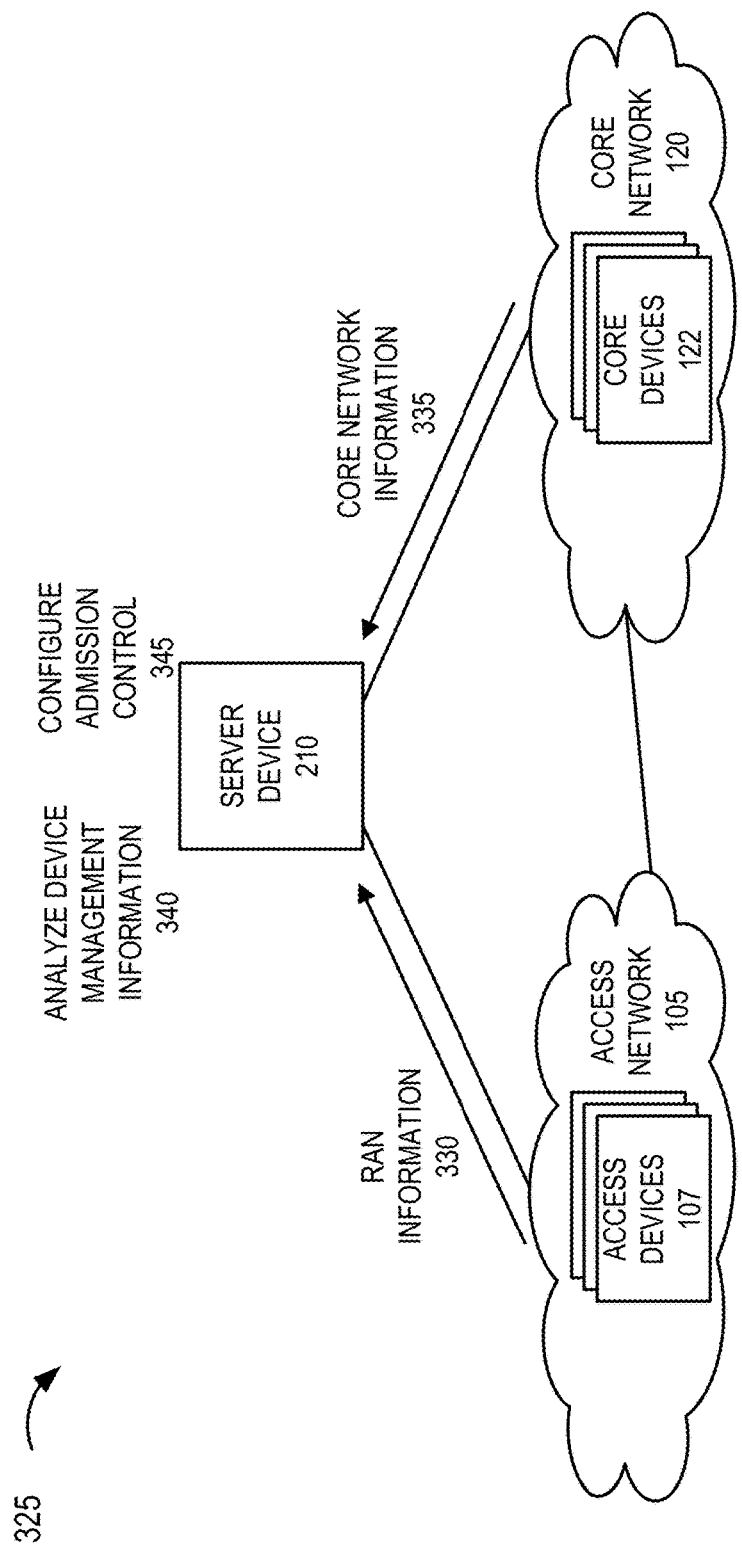
FIG. 3B is a diagram illustrating another exemplary process of an exemplary embodiment of the admission and congestion control service.

FIG. 3B is a diagram illustrating an exemplary process 325 of an exemplary embodiment of the admission and congestion control service. For example, referring to FIG. 2 performing an analysis 230, and FIG. 3B, server device 210 may obtain and use various types of information to configure admission control for end devices 130.

According to an exemplary embodiment, server device 210 may obtain RAN information 330 from access network 105. For example, RAN information 330 may include congestion information pertaining to access devices 107 and various RAN configurations. For example, the congestion information may include parameters and values relating to load levels in relation to various network resources (e.g. physical, logical, virtual) including, for example, network slices, radio resources (e.g., physical resource blocks, radio spectrum, etc.), and other load levels pertaining to functional splits (e.g., interfaces, options, etc.) and network services (e.g., DC, CA, etc.), as described herein. Additionally, for example, the RAN configurations may relate to the type of access device 107 (e.g., gNB, eNB, eLTE eNB, etc.), the type of options (e.g., 1, 2, 3, etc.), the plane of communication (e.g., user plane, control plane, etc.), the type of RAT (e.g., 4G, 5G, etc.) and/or radio spectrum (e.g., frequency band, etc.), involves a network slice or not, and/or associated with a particular network service (e.g., DC, CA, etc.). RAN information 330 may include other types of information, such as mobility information (e.g., handovers, etc.) relating to end devices 130.

For example, access devices 107 may include logic that generates and transmit congestion information to server device 210, directly or indirectly, such as via an intermediary network (e.g., core network 120, external network 115) and/or an intermediary network device (e.g., core device 122, external device 117). Additionally, for example, access devices 107 may include logic that receives admission control information (e.g., access class barring information) to enable the mitigation of congestion or predictive or anticipated congestion.

According to an exemplary embodiment, server device 130 may obtain core network information 335 from core network 120. For example, core network information 335 may include subscription profile information pertaining to end devices 130. The subscription profile information may include end device profile information (e.g., end device identifiers, category or type of end device 130, tier of subscription, etc.). Core network information 335 may also include mobility information and historical behavior information pertaining to end devices 130. For example, the historical behavior information may include information indicating applications used, mobility information, time periods of activity and inactivity, and so forth.

Figure 3C:
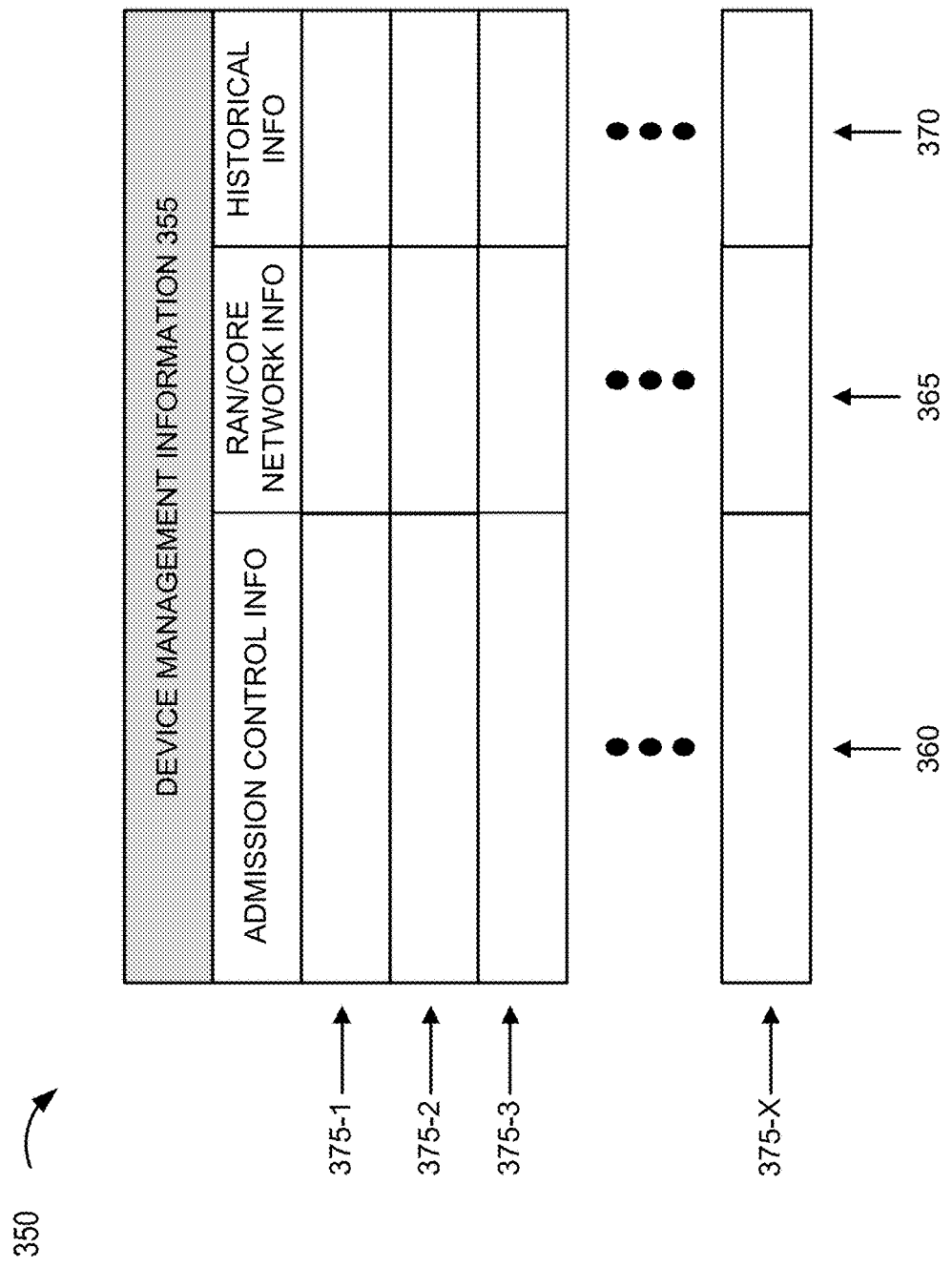
FIG. 3C is a diagram illustrating exemplary device management information.

Additionally, server device 210 may use other information to manage admission control for end devices 130. FIG. 3C is a diagram illustrating exemplary device management information 355 that may be stored in a table 350. As illustrated, device management information 355 may include admission control information 360, RAN and/or core network information 365, and historical information 370. As further illustrated, device management information 355 may include mappings 375-1 through 375-x (also referred to collectively as mappings 375 or individually or generally as mapping 375) between information 360, 365, and 370.

Device management information 355 is illustrated in tabular form merely for the sake of description. According to other implementations, device management information 355 may be implemented in a data structure different from a table (e.g., a list, a flat file, etc.), a database, or other type of data file.

For example, server device 210 may store and manage admission control information configured on end devices 130 or may retrieve the admission control information from another resource. Exemplary admission control information was previously described and illustrated in relation to FIG. 3A. Additionally, RAN information and core network information 365 may include information previously described in relation to FIG. 3B. Historical information 370 may include historical congestion information relating to access devices 107, a geographic area in which one or multiple access devices 107 reside or provide wireless coverage, and/or other configurable criterion. The historical congestion information may include time information (e.g., date, month, week, day, time, etc.), and/or other context information.

Historical information 370 may include other types of information, such as mobility information related to end devices 130. For example, location information of end device 130 entering a certain location (e.g., a geo-fenced area or other type of area) may serve as a basis to trigger server device 210 to change EAB values for a class of end devices 130 (e.g., many end devices 130 entering a port may trigger an EAB value to be changed for certain class of end devices 130). As such, historical information 370 may indicate the re-occurrence of various types of events (e.g., either with the same end devices 130 or different end devices 130), and such context information may be used to provide a predictive change to access class values of end devices 130. According to another example, sensor data (e.g., pressure, temperature, altitude, etc.) may be collected from end devices 130 (e.g., a drone or other type of end device 130) and may be relevant to determine which end devices 130 may need a class value change. For example, assume that weather information indicates a hurricane or tornado is making its way towards a geographic area. End devices 130 that may collect sensor data proximate to the geographic area may be identified (e.g., based on end device type or profile information). Server device 110 may determine that the sensor data should be afforded a higher priority than a priority typically afforded to such end devices 130. As such, server device 210 may use device management information 355 of relevance for analysis and admission control determinations. For example, server device 110 may determine that a higher access class value should be assigned to end device 130 that collect the sensor data in or proximate to the geographic area.

According to other exemplary implementations, table 350 may store additional, fewer, and/or different instances of device management information 355 in support of the admission and congestion control service, as described herein.

Referring back to FIG. 3B, as illustrated, server device 210 may analyze the device management information 340. For example, server device 210 may include one or multiple types of learning-based algorithms, such as reinforcement-based learning, unsupervised learning, semi-supervised learning, supervised learning, deep learning, learning from situation awareness and successful handling of obstacles, and/or artificial intelligence or other type of device intelligence. Server device 210 may include a model that has been trained to perform the functions of admission control for end devices 130. For example, the model may include a Generative Adversarial Network (GAN), a neural network, a probabilistic model, a Markov Chain, an autoencoder, a variational autoencoder, a non-probabilistic model, or other type of model.

Server device 210 may include a model that may be end device type specific (e.g., IoT device, smartphone, etc.), application specific, access device 110 specific, or some other configuration that supports the admission control service. Additionally, for example, server device 210 may include different models depending on different congestion information (e.g., current versus predictive). The trained model may be updated based on feedback from access devices 107, core devices 122, and/or other sources (e.g., an administrator, service provider, etc.), for example. For example, the feedback may include congestion levels. In this way, the trained model may learn whether an action (e.g., an update of admission control information for end devices 130 or omission of an update) has positively impacted congestion levels or not.

Server device 210 may learn admission control and congestion mitigation in a context-aware manner based on analytical evaluation of the device management information 355. Server device 210 may select and use the latest and most effective model(s) for network and service operations.

Based on the analysis, server device 210 may configure the admission control 345 of end device 130. For example, server device 210 may determine whether or not the admission control information of end device 130 should be updated or not, and if an update is determined, which parameter and value is to be updated and the substance of the update (e.g., a change in value for a parameter). As such, server device's 110 learning logic may optimize the configuration of admission control information (e.g., current access class value, default access class value, timed access class value) for end devices 130 in a manner that mitigates or eliminates anticipatory or current congestion at one or multiple access devices 107 and more generally within access network 105. Additionally, or alternatively, server device's 110 learning logic may change and/or optimize access class values of end devices 130 in accordance to determined priorities of access to access device 110 based on device management information, which may include historical information, sensor information, mobility information, end device profile information (e.g., type of end device, applications used, etc.), congestion information, current admission control information configured on end devices 130, and/or other types of information of relevance. According to various exemplary implementations, a determined priority of access to access device 110 may or may not be based on congestion considerations. When congestion considerations are not of issue, priority of access may be based on other contextual information, such as public safety, public security, or another type of configurable consideration.

Referring back to FIG. 2, according to this exemplary scenario, assume that server device 210 determines to update the admission control information of end device 130. In step (4), server device 210 may generate and transmit an update request 235 to end device 130. Update request 235 may include one or multiple values relating to one or multiple parameters of the admission control information.

In response to receiving update request 235, in step (5), end device 130 may perform an update 240, and in step (6), may generate and transmit an update response 245, which indicates that the update was successfully completed, to server device 210. For example, memory device 205 may overwrite admission control information previously configured. Alternatively, when end device 130 is accessing a network for the first time ever (e.g., out of the box, initial activation, etc.), memory device 205 may update any file or data pertaining to admission control (e.g., EAB access class, etc.) that may stem from the manufacturing of memory device 205 and/or end device 130, or other type of pre-configuration process.

Subsequent to the update, end device 130 may operate according to the admission control information when establishing a new radio connection with access device 107, an attach request, or other connection procedure of a network. As previously mentioned, according some exemplary embodiments, when a new EAB access class is configured, end device 130 may automatically invoke a re-attachment procedure so that the network can decide how to manage admission control for end device 130 given the new/updated admission control information. Further, when end device 130 powers up, end device 130 may operate according to the admission control information currently stored by memory device 205.

Although FIG. 2 illustrates an exemplary embodiment of a process of the admission and congestion control service, according to other exemplary scenarios, the admission and congestion control service may perform additional operations, fewer operations, and/or different operations than those illustrated and described. For example, server device 210 may not generate and transmit update request 235 when server device 210 determines that the admission control information for end device 130 does not need to be updated.

FIG. 4 is a diagram illustrating yet another exemplary process of an exemplary embodiment of the admission and congestion control service. As illustrated, access device 107 may generate and transmit a message 405. For example, message 405 may include access barring information for end devices 130. By way of further example, the access barring information may indicate one or multiple access classes (e.g., EAB access classes or other types of access classes) pertaining to end devices 130, an application category, or an application that may be barred establishing a new radio connection with access device 107. In response to receiving message 405, end device 130 and/or memory device 205 may store the access barring information 410.

According to exemplary scenario, assume end device 130 receives a trigger to establish a radio connection with access device 107. For example, a user (not illustrated) of end device 130 may initiate an application to execute. End device 130 and/or memory device 205 may compare the access barring information to the currently stored admission control information 420. Based on the comparison, end device 130 and/or memory device 205 may manage the admission control 425 of end device 130 or the initiated application based on the result of the comparison. For example, end device 130 and/or memory device 205 may compare the current class value of the admission control information to an access class included in the access barring information. Additionally, or alternatively, end device 130 and/or memory device 205 may read any timed access class value information of the admission control information and compare such information to the access class included in the access barring information. As illustrated, depending on the outcome of the comparison, end device 130 may exchange RRC connection messages 430 with access device 107 to establish an RRC connection, or bar from establishing a new radio connection 435.

Figure 5:
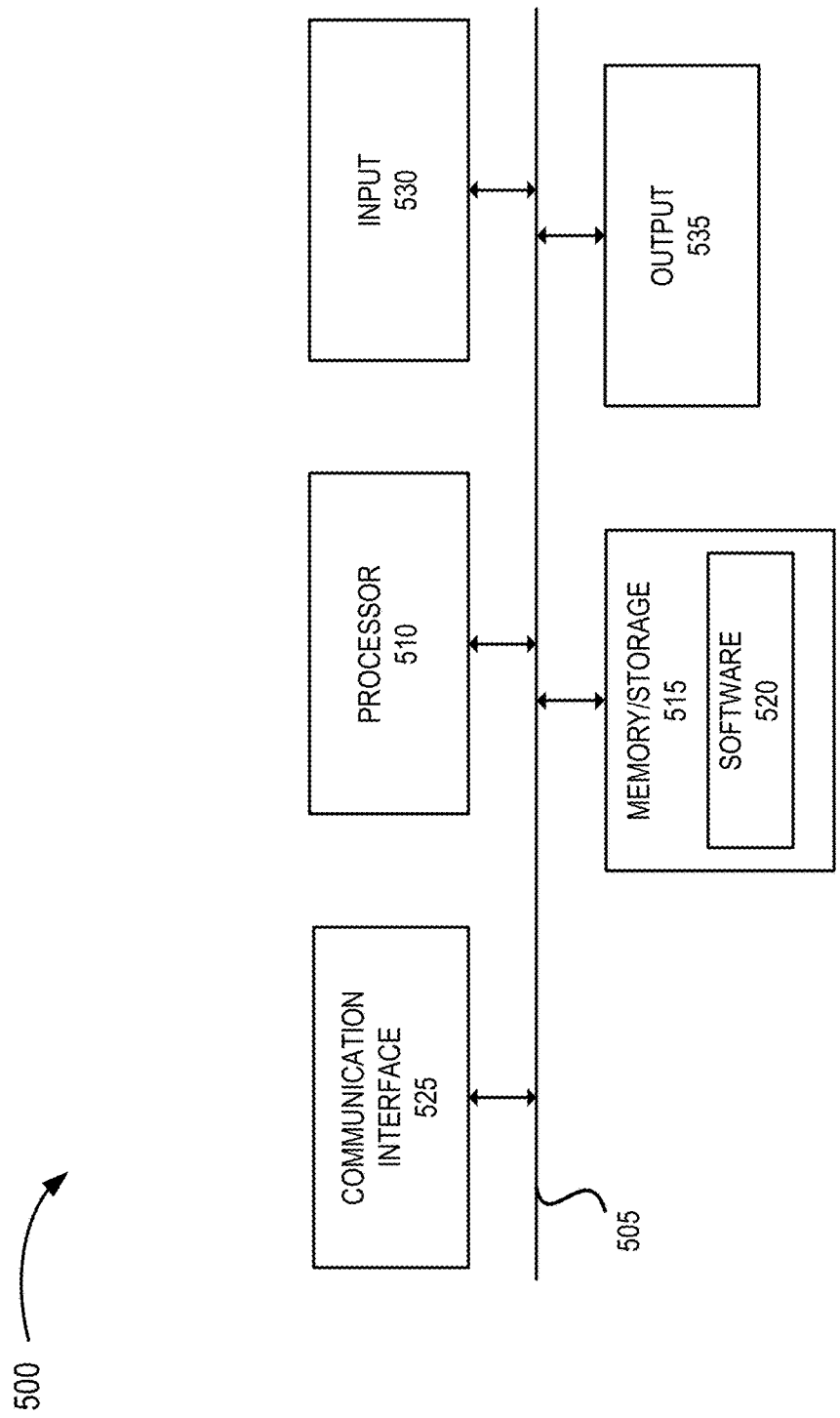
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access device 107, external device 117, core device 122, end device 130, server device 210, and/or other types of devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to server device 210, software 520 may include an application that, when executed by processor 510, provides a function and/or a process of the admission and congestion control service, as described herein. Additionally, for example, with reference to end device 130, software 520 may include an application that, when executed by processor 510, provides a function and/or a process of the admission and congestion control service. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, or a reference interface, for example.

Input 530 permits an input into device 500. For example, input 530 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, etc.).

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 performs a function or a process described herein based on the execution of hardware (processor 510, etc.).

Figure 6:
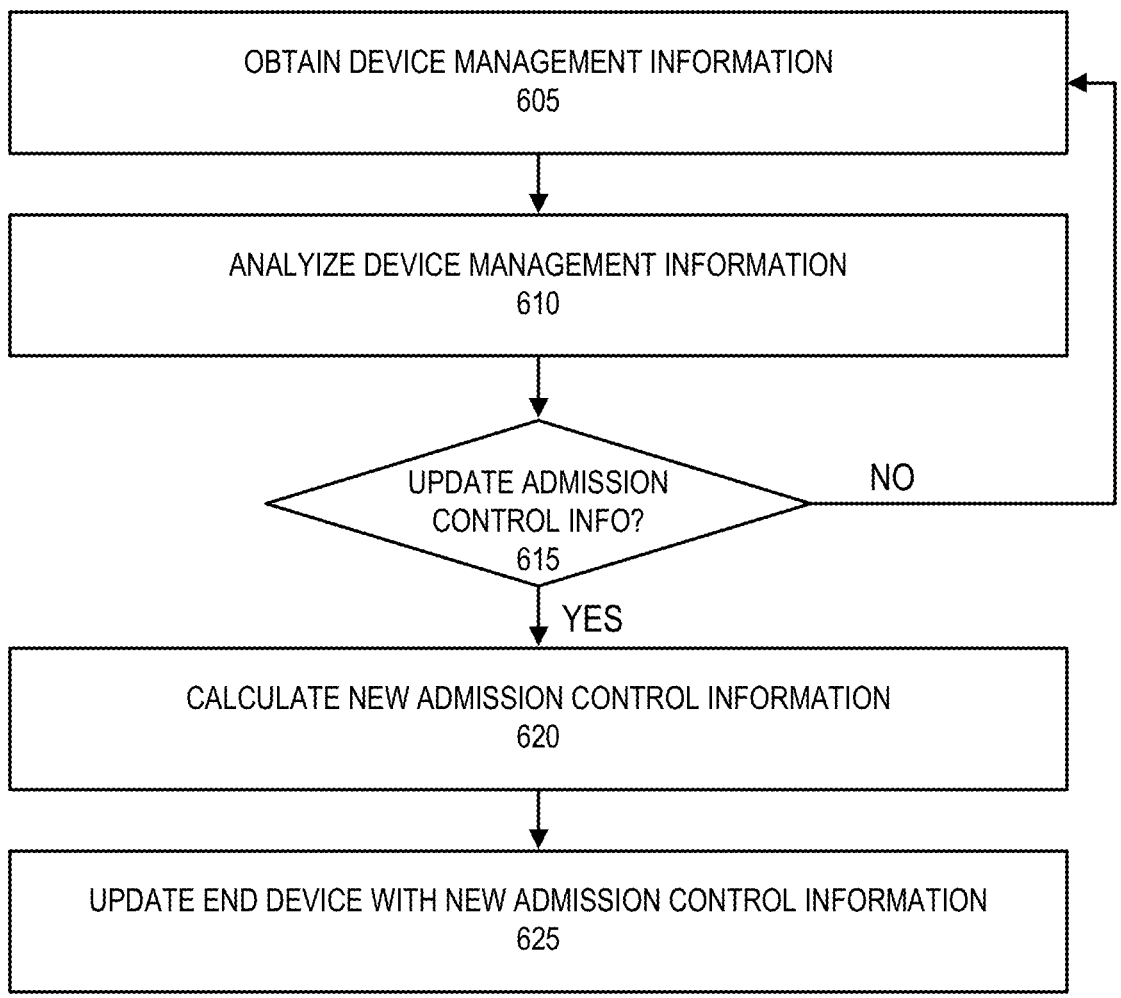
FIG. 6 is a flow diagram illustrating an exemplary process of an exemplary embodiment of the admission and congestion control service.

FIG. 6 is a flow diagram illustrating an exemplary process 600 of an exemplary embodiment of the admission and congestion control service. According to an exemplary embodiment, server device 210 may perform a step of process 600. According to an exemplary implementation, processor 510 executes software 520 to perform the step of process 600, as described herein. Alternatively, the step may be performed by execution of only hardware.

In block 605, server device 210 may obtain device management information. For example, the device management information may include admission control information pertaining to an end device 130 (e.g., admission control information 305), RAN information 330, core network information 335, historical information 370, and/or other context information of relevance for admission control determinations.

In block 610, server device 210 may analyze the device management information. For example, server device 210 may use AI/ML algorithms and models to evaluate the device management information in relation to admission control for end devices 130.

In block 615, server device 210 may determine whether to update the admission control information of one or multiple end devices 130. For example, server device 210 may determine whether to update the admission control information based on the result of the analysis.

When server device 210 determines to not update the admission control information (block 615-NO), process 600 may return to block 605. When server device 210 determines to update the admission control information (block 615-YES), server device 210 may calculate new admission control information (block 620). Server device 210 may select one or multiple parameters and calculate or generate their corresponding new values.

In block 625, server device 210 may update the one or multiple end devices 130 with the new admission control information. For example, server device 210 may invoke an update procedure with end devices 130. The update procedure may include server device 210 transmitting the new admission control information to end devices 130, end devices 130 and/or memory device 205 updating the new admission control information, and end devices 130 transmit a message to server device 210 indicating that the update was successfully completed, as previously described.

Although FIG. 6 illustrates an exemplary embodiment of a process of the admission and congestion control service, according to other exemplary scenarios, the admission and congestion control service may perform additional operations, fewer operations, and/or different operations than those illustrated and described.

Figure 7:
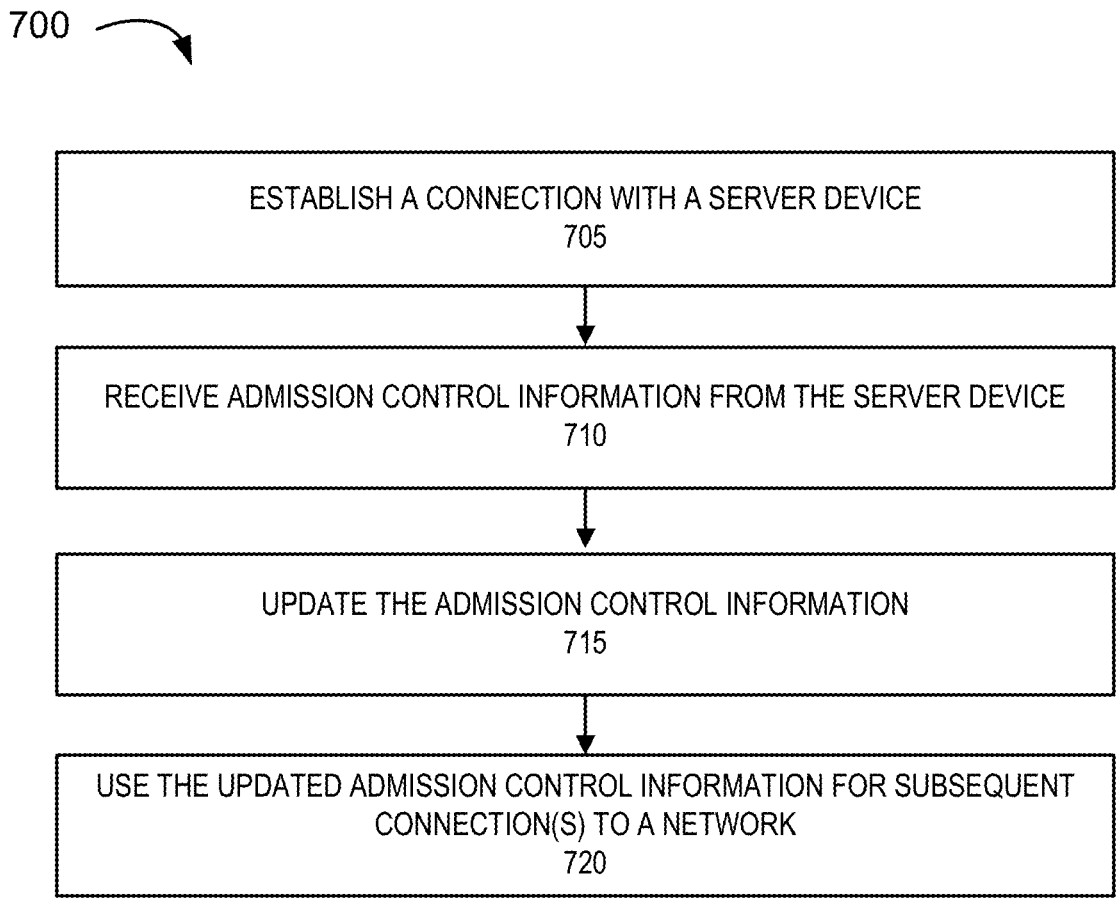
FIG. 7 is a flow diagram illustrating another exemplary process of an exemplary embodiment of the admission and congestion control service.

FIG. 7 is a flow diagram illustrating yet another exemplary process 700 of an exemplary embodiment of the admission and congestion control service. According to an exemplary embodiment, end device 130 may perform a step of process 700. According to an exemplary implementation, processor 510 executes software 520 to perform the step of process 700, as described herein. Alternatively, the step may be performed by execution of only hardware.

In block 705, end device 130 may establish a connection with server device 210. For example, memory device 205 may be configured to invoke a connection with server device 210 responsive to a trigger event, such as power-up of end device 130, as part of an attachment procedure with a network, or other configurable event.

In block 710, end device 130 may receive admission control information from server device 710. For example, as a part of a session with server device 210, end device 130 may receive admission control information from server device 210. The admission control information may include an assignment of an access class value (e.g., current, default, timed, etc.) for end device 130 and/or an application of end device 130, for example.

In block 715, end device 130 may update the admission control information. For example, end device 130 may store the received admission control information.

In block 720, end device 130 may use the updated admission control information for subsequent connection(s) to a network. For example, end device 130 may use the updated admission control information for managing admission control in view of access barring information associated with the network.

Although FIG. 7 illustrates an exemplary embodiment of another process of the admission and congestion control service, according to other exemplary scenarios, the admission and congestion control service may perform additional operations, fewer operations, and/or different operations than those illustrated and described.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
analyzing, by a network device, congestion information of a network;
determining, by the network device based on the analyzing, to update admission control information of an end device;
generating, by the network device, an update of the admission control information that includes a first access class value, which differs from a current access class value of the end device, and reconfigures the end device with the first access class value as a new current access class value, wherein the first access class value includes a timed access class value, a duration during which the timed access class value is active, and a second access class value to be used when the duration expires; and
transmitting, by the network device to the end device, the update of the admission control information.

2. The method of claim 1, further comprising:
analyzing, by the network device, historical sensor information associated with end devices; and wherein the determining further comprises:
determining, by the network device based on the analyzing of the historical sensor information, to update the admission control information of the end device.

3. The method of claim 1, wherein the network is a radio access network (RAN), and the congestion information pertains to a RAN device of the RAN, and the method further comprises:
updating, by the network device, a trained model based on feedback from the network.

4. The method of claim 1, wherein the first access class value includes a third access class value of an application of the end device.

5. The method of claim 1, further comprising:
transmitting, by the network device to the end device before analyzing, a request for current admission control information of the end device; and
receiving, by the network device from the end device, a response that includes the current access class value of the end device.

6. The method of claim 1, wherein the first access class value includes a default access class value.

7. The method of claim 1, wherein the update of the admission control information includes a value indicating a total number of access class values supported by the end device.

8. The method of claim 1, wherein the network device is one of a smart card Over-The-Air (OTA) server, a device management (DM) server, or a Lightweight Machine to Machine (LW M2M) server.

9. A network device comprising:
a processor configured to:
analyze congestion information of a network;
determine, based on the analysis, to update admission control information of an end device;
generate an update of the admission control information that includes a first access class value, which differs from a current access class value of the end device, and reconfigures the end device with the first access class value as a new current access class value, wherein the first access class value includes a timed access class value, a duration during which the timed access class value is active, and a second access class value to be used when the duration expires; and
transmit to the end device the update of the admission control information.

10. The network device of claim 9, wherein the processor is further configured to:
analyze historical sensor information associated with end devices; and wherein when determining, the processor is further configured to:
determine, based on the analysis of the historical sensor information, to update the admission control information of the end device.

11. The network device of claim 9, wherein the network is a radio access network (RAN), and the congestion information pertains to a RAN device of the RAN, and wherein the processor is further configured to:
update a trained model based on feedback from the network.

12. The network device of claim 9, wherein the first access class value includes a third access class value of an application of the end device.

13. The network device of claim 9, wherein the processor is further configured to:
transmit to the end device before the analysis, a request for current admission control information of the end device; and
receive from the end device, a response that includes the current access class value of the end device.

14. The network device of claim 9, wherein the first access class value includes a default access class value.

15. The network device of claim 9, wherein the update of the admission control information includes a value indicating a total number of access class values supported by the end device.

16. The network device of claim 9, wherein the network device is one of a smart card Over-The-Air (OTA) server, a device management (DM) server, or a Lightweight Machine to Machine (LW M2M) server.

17. A non-transitory computer-readable storage medium storing instructions executable by a processor of a network device, which when executed cause the network device to:
analyze congestion information of a network;
determine, based on the analysis, to update admission control information of an end device;
generate an update of the admission control information that includes a first access class value, which differs from a current access class value of the end device, and reconfigures the end device with the first access class value as a new current access class value, wherein the first access class value includes a timed access class value, a duration during which the timed access class value is active, and a second access class value to be used when the duration expires; and
transmit to the end device the update of the admission control information.

18. The non-transitory computer-readable storage medium of claim 17, wherein the first access class value includes a default access class value.

19. The non-transitory computer-readable storage medium of claim 17, wherein the instructions further comprise instructions, which when executed cause the network device to:
- transmit to the end device before the analysis, a request for current admission control information of the end device; and
- receive from the end device, a response that includes the current access class value of the end device.

20. The non-transitory computer-readable storage medium of claim 17, wherein the first access class value includes a default access class value.

\* \* \* \* \*